(12) United States Patent
Campagnolo

(10) Patent No.: US 6,431,575 B2
(45) Date of Patent: Aug. 13, 2002

(54) STEERING BEARING ASSEMBLY FOR A BICYCLE

(75) Inventor: Valentino Campagnolo, Venice (IT)

(73) Assignee: Campagnolo Srl, Venice (IT)

( * ) Notice: Subject to any disclaimer, the term of this patent is extended or adjusted under 35 U.S.C. 154(b) by 0 days.

(21) Appl. No.: 09/850,068

(22) Filed: May 8, 2001

(30) Foreign Application Priority Data

May 9, 2000 (IT) ........................................ TO00A0429

(51) Int. Cl.7 .............................................. B62K 21/06
(52) U.S. Cl. .................................... 280/279; 74/551.11
(58) Field of Search ................................ 280/279, 280, 280/276, 270; 74/551.1

(56) References Cited

U.S. PATENT DOCUMENTS

| | | | | |
|---|---|---|---|---|
| 4,082,307 A | * | 4/1978 | Tait | 280/277 |
| 4,493,490 A | * | 1/1985 | Ohma | 280/276 |
| 5,273,301 A | * | 12/1993 | Klein | 280/279 |
| 5,330,220 A | * | 7/1994 | Nagano | 280/279 |
| 5,775,709 A | * | 7/1998 | Chen | 280/279 |
| 5,893,574 A | * | 4/1999 | Campagnolo | 280/279 |
| 6,019,017 A | * | 2/2000 | Lin | 74/551.1 |
| 6,231,063 B1 | * | 5/2001 | Chi | 280/279 |

* cited by examiner

Primary Examiner—Avraham Lerner
(74) Attorney, Agent, or Firm—Sughrue Mion, PLLC

(57) ABSTRACT

A steering bearing assembly for a bicycle comprises a lower bearing unit including a set of balls arranged between a first race connected to the head tube of the frame of the bicycle and a second race connected to the steering tube, which connects the front fork of the bicycle to the handlebars. The second race is connected to the steering tube with interposition of a bottom supporting ring having a plane undersurface which rests against a stop surface of the fork. The bottom supporting ring incorporates elastic means which recall it towards a configuration of minimum diameter in order to keep the bottom supporting ring blocked on the steering tube and at the same time enable its disassembly by means of easy and fast operations.

7 Claims, 2 Drawing Sheets

STEERING BEARING ASSEMBLY FOR A BICYCLE

BACKGROUND OF THE INVENTION

The present invention relates to steering-bearing assemblies for bicycles, of the type comprising:

a head tube, which forms part of the frame of a bicycle;

a steering tube, for connecting the front fork of a bicycle to the handlebars of the bicycle;

a bearing assembly, for supporting the steering tube so that it can turn within the head tube, in which said bearing assembly includes:
an upper bearing unit; and
a lower bearing unit;
in which said lower bearing unit comprises:
a first race connected to said head tube;
a second race connected to said steering tube; and
a bottom supporting ring arranged between said second race and the steering tube and having a bottom face substantially perpendicular to the axis of the assembly that rests against a stop surface of the fork.

A steering bearing assembly of the type referred to above is, for example, described and illustrated in U.S. Pat. No. 5,893,574 assigned to the present applicant.

In the said known device, which has also been produced and marketed by the applicant, the aforesaid bottom supporting ring, which rests against the stop surface of the fork, is rigidly connected to the steering tube by means of an interference fit. A possible disassembly of the aforesaid bottom supporting ring is usually obtained by introducing a tool between the undersurface of the bottom supporting ring and the stop surface of the fork so as to exert on the bottom supporting ring a force which tends to move it away from the aforesaid stop surface. More recently, however, there has been a wide diffusion of steering bearing assemblies in which the first race of the bottom bearing assembly rests directly against the inner surface of the head tube, and the latter has a lower end portion that extends downwards until it is adjacent with the aforesaid stop surface of the fork, surrounding the bottom supporting ring completely. In such structures, disassembly of the bottom supporting ring, which is previously mounted with interference fit, consequently proves problematical, in so far as access of a tool to the undersurface of the bottom supporting ring proves difficult, and in so far as it is moreover difficult to exert on the bottom supporting ring a sufficiently large force to enable its disassembly.

SUMMARY OF THE INVENTION

The purpose of the present invention is to provide a steering bearing assembly of the type referred to at the beginning of the present description in which the aforesaid bottom supporting ring can be mounted and removed with extreme ease and speed.

With a view to achieving the above purpose, the subject of the invention is a steering bearing assembly having all the characteristics indicated at the beginning of the present description and further characterized in that the aforesaid bottom supporting ring is mounted with play on said steering tube. Preferably, the aforesaid bottom supporting ring incorporates elastic means which recall it towards a configuration of minimum diameter in order to keep said bottom supporting ring blocked on said steering tube. Thanks to this characteristic, the bottom supporting ring forming part of the steering bearing assembly according to the invention can be mounted with extreme ease at the base of the steering tube, exploiting, if need be, the elasticity that the said bottom supporting ring possibly has. In the same way, the operation of disassembly proves extremely easy as compared to the case of disassembly of a ring mounted with interference fit as in the known solutions.

Preferably, the aforesaid bottom supporting ring is made of plastic material. In this case, according to the preferred embodiment of the invention, the bottom supporting ring is made up of a plurality of ring sectors which are identical and separate from one another and around which an open-ring wire spring is set. This conformation and arrangement enables a more standardized and economical fabrication of the supporting ring made of plastic material.

BRIEF DESCRIPTION OF THE DRAWING

Further characteristics and advantages of the present invention will emerge from the ensuing description, with reference to the attached drawings, which are provided purely by way of non-limiting examples and in which.

DETAILED DESCRIPTION OF THE INVENTION

Figures 1, 2:
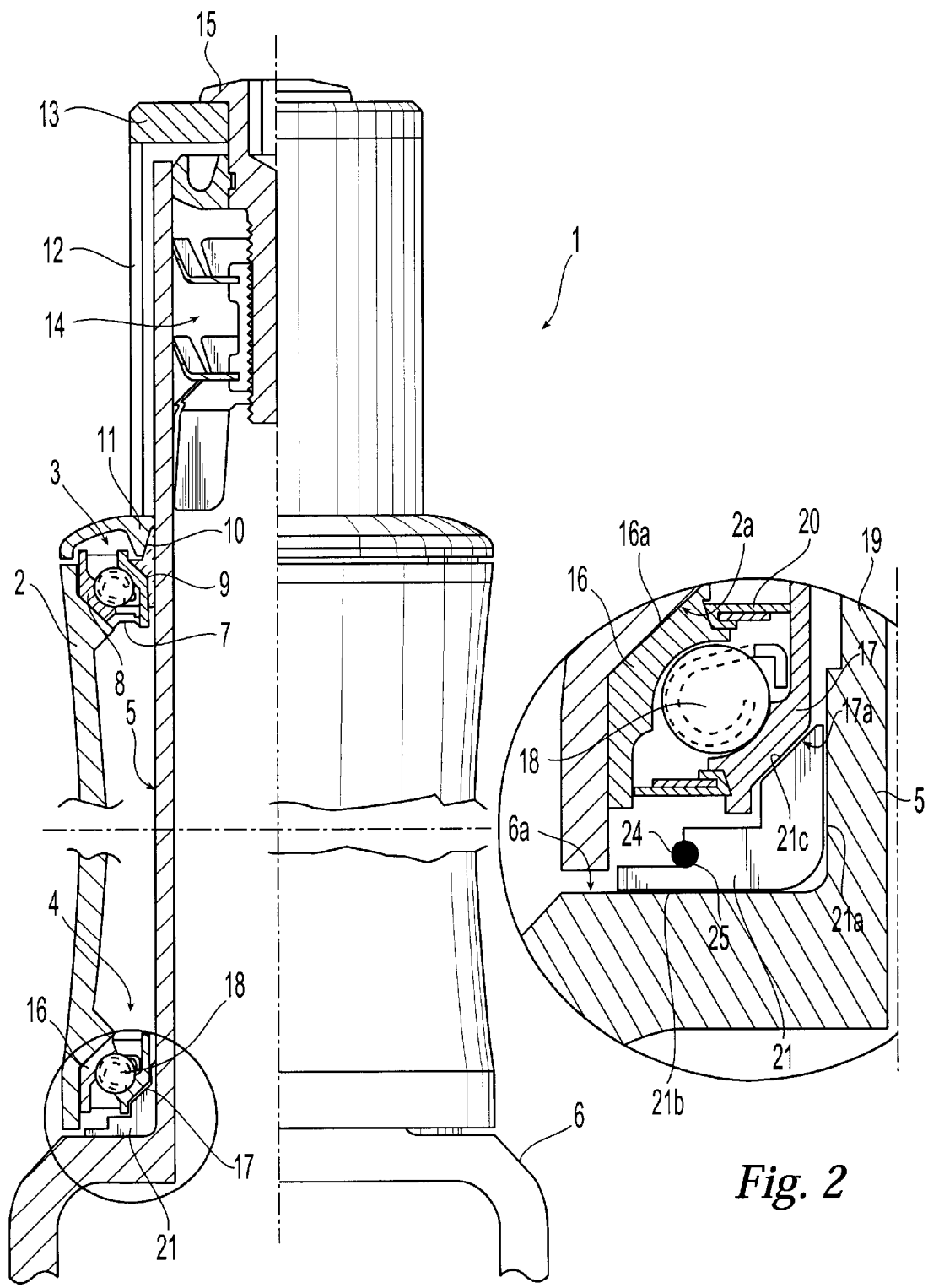
FIG. 1 is an overall view, in relation, sectioned in its left-hand half, of a preferred embodiment of the steering bearing assembly according to the invention.
FIG. 2 is a view at an enlarged scale of a detail of FIG. 1.

The steering bearing assembly illustrated in FIG. 1 is of the general type known from the U.S. Pat. No. 5,893,574 assigned to the present applicant. As was illustrated in the aforesaid known document, the steering bearing assembly, designated as a whole by the reference number 1, comprises a head tube 2 which forms part of the frame of a bicycle and within which an upper bearing unit 3 and a lower bearing unit 4 are mounted in such a way that a steering tube 5 can be mounted so that it is able to turn. The steering tube 5 connects the front fork 6 of the bicycle (visible only partially in FIG. 1) to the bicycle handlebars (not illustrated).

The present invention refers specifically to the lower bearing unit 4 of the steering bearing assembly 1. In the example illustrated, the upper bearing unit 3 is of the type that forms the subject of the U.S. Pat. No. 5,893,574 already cited more than once previously. For this reason, in the ensuing description the upper bearing unit 3 will be described in brief. The upper bearing unit 3 includes a set of balls 7 mounted between a first race 8, which is connected to the head tube 2, and a second race 9, which is connected to the steering tube 5. Again in conformance with the US patent already referred to several times above, the race 9 is provided with a circumferential set of elastic teeth 10, which are tightened over the steering tube 5 as a result of the conical fit between the outer surface of the teeth 10 and the inner surface of a cup 11 which is pressed downwards via a spacer tube 12 by a cap 13 which is mounted at the top of the steering tube 5 by means of a star washer 14 tightened by means of a bolt 15. As already mentioned, however, the structure and arrangement of the upper bearing unit 3 described above basically correspond to what is illustrated in the U.S. Pat. No. 5,893,574. As compared to the above known document, the arrangement illustrated in FIG. 1 of the upper bearing unit 3 differs only in that, in the present case, the race 8 has a conical surface which fits to a co-operating conical surface made directly in the inner wall of the head tube 2, whereas, in the case of the prior document referred to previously, the race 8 is engaged against a cup support which is in turn connected within the head tube 2. For the purposes of the present invention, however, the aforesaid constructional difference is not important, and both of the choices mentioned above are possible.

Figure 3:
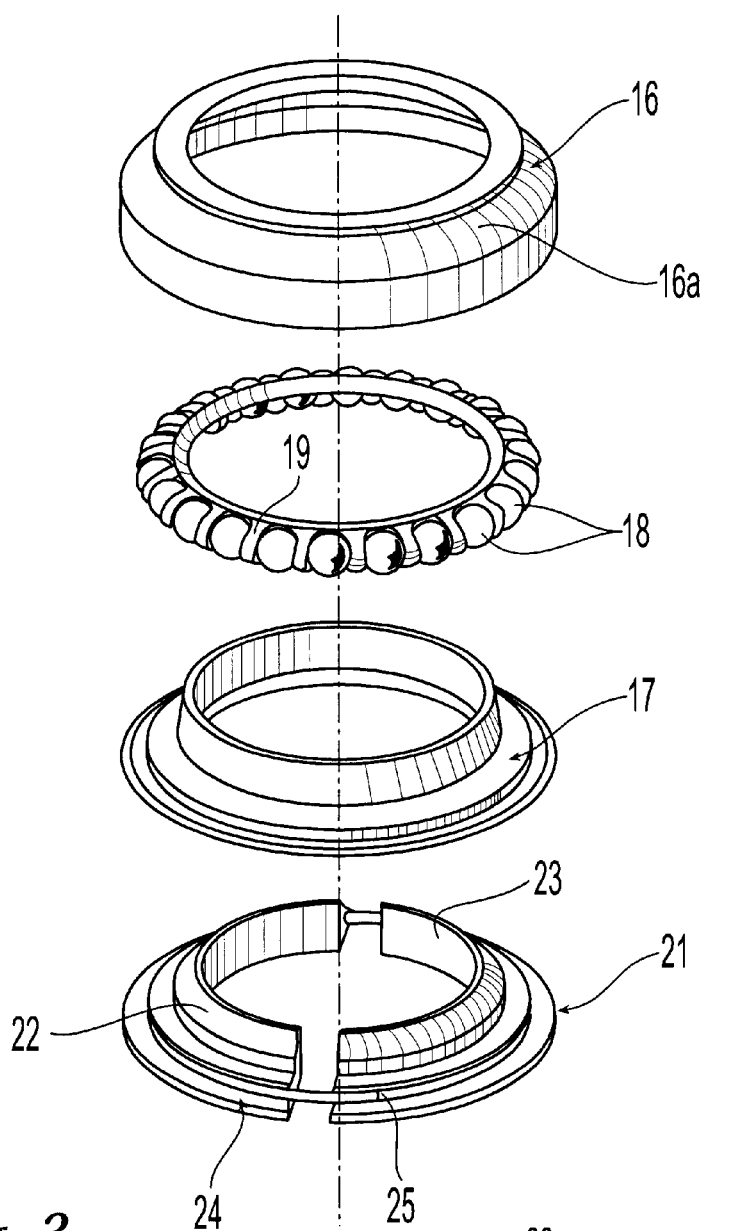
FIG. 3 is a perspective exploded view of the detail of FIG. 2.
Figure 4:
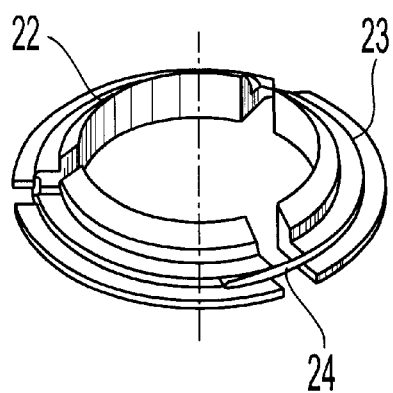
FIG. 4 illustrates a variant of a detail of FIG. 3.

With reference also to FIGS. 2–4, the lower bearing unit 4 comprises, again in line with what has already been illustrated in the U.S. Pat. No. 5,893,574, a first race 16 connected to the head tube 2, a second race 17 connected, in the way that will be illustrated in what follows, to the steering tube 5, and a set of balls 18 set between the races 16 and 17 and provided with a ball retainer 19 (see FIG. 3). Also in this case, as in the case of the upper bearing unit 3, the first race 16 has a conical surface 16a (see FIGS. 2 and 3), which co-operates with a corresponding conical surface 2a (see FIG. 2) made directly on the inner wall of the head tube 2 (in the case of the known device mentioned above, the first race of the lower bearing unit is mounted within a cup element separate from the head tube and rigidly connected to the latter). Again in line with what was mentioned above with reference to the upper bearing unit 3, also for the lower bearing unit it is not possible to rule out a solution different from the one illustrated in the attached drawings which envisages mounting of the race 16 within an element separate from the head tube 2 and rigidly connected to the latter, as is illustrated in the prior document mentioned above. With reference to FIG. 2, also set between the two races 16 and 17 are lip seals 20, respectively supported by the two races 16 and 17.

In accordance with the present invention, the second race 17 is connected to the steering tube 5 with interposition of a bottom supporting ring 21 which is provided with elastic means that tend to recall it into a condition of minimum diameter in order to block the said bottom supporting ring 21 on the steering tube 5. As may be clearly seen from FIG. 2, the bottom supporting ring 21 has a cylindrical inner surface 21a which surrounds the steering tube 5, a plane undersurface 21b which is orthogonal to the axis of the steering bearing assembly and which rests against an stop surface 6a of the fork 6, and an upper conical surface 21c which co-operates with a corresponding conical surface of the race 17.

In the preferred embodiment, which is illustrated in FIG. 3, the bottom supporting ring 21 is made up of two ring sectors 22, 23 which are identical and separate from one another and about which is set a circlip 24. As may be clearly seen in FIG. 2, the circlip 24 is received in a circumferential seat 25 made on the outer surface of the ring sectors 22, 23.

Thanks to the arrangement described above, the bottom supporting ring 21 may be mounted on the steering tube 5 very quickly and easily in that it can be widened by exploiting the elasticity of the circlip 24, which then keeps the ring sectors 22, 23 tightened against the steering tube 5. Likewise, removal of the bottom supporting ring 21 is far simpler than it is in the case of the known art, where the bottom supporting ring is mounted with interference fit on the steering tube 5, This greater ease of disassembly is particularly useful in cases similar to the one illustrated in the annexed drawings, where the race 16 of the lower steering bearing unit is in direct contact with the inner surface of the head tube 2 and where the said head tube has a bottom end portion which extends downwards until it is adjacent to the fork 6 so as to surround the bottom supporting ring 21 completely (see FIG. 1).

The construction in identical and separate ring sectors renders the fabrication of the bottom supporting ring simpler and more economical, in particular in reference to the case where the said bottom supporting ring is made of plastic material. FIG. 4 illustrates a variant in which the bottom supporting ring 21 is made up of three separate sectors 22, 23, 26.

Of course, without prejudice to the principle of the invention, the details of construction and the embodiments may vary widely with respect to what is described and illustrated herein purely by way of example, without thereby departing from the scope of the present invention.

For example, the elastic means with which the bottom supporting ring is equipped may be made with a conformation that is even altogether different from the one illustrated herein purely by way of example, or else again, it is possible to envisage a bottom supporting ring consisting of a body made of a single piece in the form of an open ring.

What is claimed is:

1. A steering-bearing assembly for a bicycle, comprising:
 a head tube forming part of the frame of a bicycle;
 a steering tube, for connecting the front fork of a bicycle to the handlebars of the bicycle;
 a bearing assembly, for supporting the steering tube so that it can turn within the head tube, in which said bearing assembly includes:
  an upper bearing unit; and
  a lower bearing unit;
  in which said lower bearing unit comprises:
   a first race connected to said head tube;
   a second race connected to said steering tube; and
   a bottom supporting ring arranged between said second race and said steering tube and having an undersurface, substantially perpendicular to the axis of the assembly, that rests against a stop surface of the fork,
   wherein said bottom supporting ring is sized in such a way that it can be mounted with play on said steering tube.

2. A steering-bearing assembly for a bicycle, comprising:
 a head tube forming part of the frame of a bicycle;
 a steering tube, for connecting the front fork of a bicycle to the handlebars of the bicycle;
 a bearing assembly, for supporting the steering tube so that it can turn within the head tube, in which said bearing assembly includes:
  an upper bearing unit; and
  a lower bearing unit;

in which said lower bearing unit comprises:
- a first race connected to said head tube;
- a second race connected to said steering tube; and
- a bottom supporting ring arranged between said second race and said steering tube and having an undersurface, substantially perpendicular to the axis of the assembly, that rests against a stop surface of the fork,
- wherein said bottom supporting ring is sized in such a way that it can be mounted with play on said steering tube,
- wherein said bottom supporting ring includes elastic means that recall it towards a conformation of minimum diameter in order to keep said bottom supporting ring blocked on said steering tube.

3. The steering bearing assembly according to claim 2, wherein said bottom supporting ring includes a plurality of ring sectors which are separate from one another and about which is set a circlip.

4. The steering bearing assembly according to claim 3, wherein said ring sectors are made of plastic material.

5. The steering bearing assembly according to claim 2, wherein said first race and said second race have conical surfaces for fitting to co-operating surfaces respectively made on the inner surface of the head tube and on the upper surface of the bottom supporting ring.

6. The steering bearing assembly according to claim 2, wherein said head tube has a bottom end portion that extends as far as in the proximity of said stop surface of said fork and complete surrounds said bottom supporting ring.

7. The steering bearing assembly according to claim 3, wherein the aforesaid ring sectors are identical to one another.

* * * * *